(12) United States Patent
Brandvold

(10) Patent No.: US 8,314,275 B2
(45) Date of Patent: Nov. 20, 2012

(54) METHODS FOR PRODUCING BIOMASS-DERIVED PYROLYSIS OILS HAVING INCREASED PHASE STABILITY

(75) Inventor: Timothy A. Brandvold, Arlington Heights, IL (US)

(73) Assignee: UOP LLC, Des Plaines, IL (US)

( * ) Notice: Subject to any disclaimer, the term of this patent is extended or adjusted under 35 U.S.C. 154(b) by 202 days.

(21) Appl. No.: 12/949,077

(22) Filed: Nov. 18, 2010

(65) Prior Publication Data

US 2011/0120909 A1     May 26, 2011

Related U.S. Application Data

(60) Provisional application No. 61/263,644, filed on Nov. 23, 2009.

(51) Int. Cl.
    *C10G 3/00*       (2006.01)
    *C10L 1/18*       (2006.01)

(52) U.S. Cl. .............................. 585/240; 585/242; 201/21
(58) Field of Classification Search ................. 585/240, 585/242; 201/21
See application file for complete search history.

(56) References Cited

U.S. PATENT DOCUMENTS

| | | | |
|---|---|---|---|
| 7,960,598 B2 * | 6/2011 | Spilker et al. ................. | 585/240 |
| 8,153,850 B2 * | 4/2012 | Hall et al. ..................... | 585/240 |
| 2009/0113787 A1 | 5/2009 | Elliott et al. | |
| 2009/0250376 A1 | 10/2009 | Brandvold et al. | |
| 2009/0253948 A1 | 10/2009 | McCall et al. | |
| 2009/0259082 A1 * | 10/2009 | Deluga et al. ................... | 585/14 |
| 2009/0294324 A1 * | 12/2009 | Brandvold et al. ............. | 208/17 |

\* cited by examiner

*Primary Examiner* — Nina Bhat
(74) *Attorney, Agent, or Firm* — David J Piasecki

(57) ABSTRACT

A process for stabilizing pyrolysis oil has been developed. The process involves heating the pyrolysis oil at a temperature of about 40° C. to about 85° C. under a reducing atmosphere for a time to stabilize the oil. The reducing atmosphere or gas is preferably hydrogen.

7 Claims, No Drawings

METHODS FOR PRODUCING BIOMASS-DERIVED PYROLYSIS OILS HAVING INCREASED PHASE STABILITY

CROSS-REFERENCE TO RELATED APPLICATION

This application claims the benefit of U.S. Provisional Application No. 61/263,644 which was filed on Nov. 23, 2009.

FIELD OF THE INVENTION

The present invention generally relates to methods for producing biofuels, and more particularly relates to methods for producing biomass-derived pyrolysis oils having increased phase stability.

DESCRIPTION OF RELATED ART

The use of biofuels is of growing interest due to an increased environmental awareness. Biomass-derived pyrolysis oils obtained from the pyrolysis of biomass are considered to be a promising biofuel. Biomass-derived pyrolysis oils have the potential to replace up to 60% of transportation fuels thereby reducing the dependency on conventional petroleum and reducing its environmental impact.

Fast pyrolysis is a process in which organic materials are rapidly heated to 450°-600° C. in the presence of less than the stoichiometric amount of air needed for complete combustion. Under these conditions, organic vapors, pyrolysis gases and char are produced. The pyrolysis gases contain small amounts of reducing gases, such as hydrogen, carbon monoxide, etc. The vapors are condensed to biomass-derived pyrolysis oil. Pyrolysis of biomass under conditions of such rapid heating and short reactor residence times can produce low-viscosity, single-phase biomass-derived pyrolysis oil. Most projected uses of biomass-derived pyrolysis oil require that it retain these initial physical properties during storage, shipment and use. Unfortunately, some biomass-derived pyrolysis oils become unstable, rapidly becoming more viscous and exhibit phase separation. These conditions are even further exacerbated at elevated temperatures.

Accordingly, it is desirable to provide methods for producing biomass-derived pyrolysis oils having increased phase stability enabling the retention of its low viscosity and single phase during storage, shipment and use. Furthermore, other desirable features and characteristics of the present invention will become apparent from the subsequent detailed description of the invention and the appended claims, taken in conjunction with this background of the invention.

SUMMARY OF THE INVENTION

This invention relates to a process for stabilizing pyrolysis oil. One embodiment of the invention is a method for producing a biomass-derived pyrolysis oil having increased phase stability comprising: exposing biomass-derived pyrolysis oil to a reducing gas under pressure; and heating the biomass-derived pyrolysis oil to a temperature of about 40° C. to about 85° C. for a period of time.

DETAILED DESCRIPTION

The following detailed description of the invention is merely exemplary in nature and is not intended to limit the invention or the application and uses of the invention. Furthermore, there is no intention to be bound by any theory presented in the preceding background of the invention or the following detailed description of the invention.

In accordance with an exemplary embodiment of the present invention, as-produced biomass-derived pyrolysis oil is thermally treated at temperatures of about 40° C. to about 85° C. under a reducing gas atmosphere under pressure for a predetermined time. As used herein, "under pressure" means from greater than 101 kPa (14.7 psi) up to about 8274 kPa (1200 psig), preferably about 689 kPa (100 psig) to about 4137 kPa bar (600 psig). These conditions result in a biomass-derived pyrolysis oil having increased phase stability as measured by sample homogeneity upon storage at elevated temperature (about 45° to about 60° C.). It is believed that there is a synergistic effect between the thermal treatment and the reducing gas under pressure.

The present invention is directed to a method for producing biomass-derived pyrolysis oils having increased phase stability. The method begins by providing a biomass-derived pyrolysis oil from a source such as a feed tank or other source operative to provide such biomass-derived pyrolysis oil The biomass-derived pyrolysis oil may be produced, for example, from fast pyrolysis of wood biomass. However, the invention is not so limited. Virtually any form of biomass can be considered for pyrolysis to produce biomass-derived pyrolysis oil. In addition to wood, biomass-derived pyrolysis oil may be derived from biomass material such as bark, agricultural wastes/residues, nuts and seeds, algae, grasses, forestry residues, cellulose and lignin, or the like. The biomass-derived pyrolysis oil may be obtained by different modes of pyrolysis, such as fast pyrolysis, vacuum pyrolysis, catalytic pyrolysis, and slow pyrolysis (also known as carbonization), under different processing parameters. Such biomass-derived pyrolysis oil is available from, for example, Ensyn Technologies Inc., Ontario, Canada.

Next, the biomass-derived pyrolysis oil is introduced into a treatment chamber. The biomass-derived pyrolysis oil is exposed to a reducing gas under pressure (up to about 8274 kPa (1200 psig), preferably about 689 kPa (100 psig) to about 4137 kPa (600 psig)) in the treatment chamber, and is heated to a temperature of about 40° C. to about 85° C., preferably between about 60° C. to about 80° C. for a period of time of about 0.5 hours to about 12 hours, preferably about one to about three hours (hereinafter the "residence time") to effect improved stabilization of the biomass-derived pyrolysis oil. The biomass-derived pyrolysis oil may be heated during exposure to the reducing gas, before exposure, or after exposure. The reducing gas may be selected from the group consisting of hydrogen, carbon monoxide, natural gas, and combinations thereof. The reducing gas may be used in combination with nitrogen. The reducing gas (and nitrogen) may be provided from a supply tank, or, alternatively, may be provided from the pyrolysis gases formed during pyrolysis of the biomass.

The invention claimed is:

1. A method for producing a biomass-derived pyrolysis oil having increased phase stability comprising:
   exposing biomass-derived pyrolysis oil to a reducing gas under pressure; and
   heating the biomass-derived pyrolysis oil to a temperature of about 40° C. to about 85° C. for a time sufficient to stabilize the pyrolysis oil.

2. The method of claim 1 where the reducing gas is selected from the group consisting of hydrogen, carbon monoxide, natural gas, and combinations thereof.

3. The method of claim 2 where the reducing gas is hydrogen.

4. The method of claim 1 where the pressure varies from about 101 kPa to about 8274 kPa.

5. The method of claim 4 where the pressure varies from about 689 kPa to about 4137 kPa.

6. The method of claim 1 where the time varies from about 0.5 hours to about 12 hours.

7. The method of claim 6 where the time varies from about one (1) to about three (3) hours.

* * * * *